United States Patent Office
2,912,391
Patented Nov. 10, 1959

2,912,391

PROCESS FOR BLOWING AN ORGANO-PLASTIC MATERIAL WITH AN ORGANO SULFAMOYL AZIDE

William B. Hardy and Frederic H. Adams, Bound Brook, N.J., assignors to American Cyanamid Company, New York, N.Y., a corporation of Maine No Drawing. Application November 12, 1958
Serial No. 773,179

6 Claims. (Cl. 260—2.5)

This invention relates to cellular organoplastic materials and the preparation thereof. More particularly, it relates to the preparation of such cellular organoplastic materials using a new class of blowing agents which comprise organic sulfamoyl azides.

A material used as a blowing agent in the preparation of blown products, e.g., cellular rubber, should meet certain requirements. For instance, it must be capable of dispersing evenly in the material so as to produce small and uniform cells rather than coarse cells or large cavities when decomposing. Complete evolution of the gaseous decomposition product should occur prior to completion of curing to produce a blown product of as low a density as possible. The blowing agent should not interfere chemically with accelerators or other materials used in the process of curing. Moreover, the blowing agent itself should not accelerate the curing process since incomplete blowing will accompany premature curing.

While a blowing agent must be unstable at the curing temperature, it should be stable in storage, transportation and handling. At the same time, however, the above instability should not be such as to cause decomposition explosively within the treating temperature range. Moreover, decomposition should not occur until partial curing has occurred so that the stock has sufficient strength to retain the gaseous decomposition product. On the other hand, curing should not have proceeded to such an extent prior to decomposition that cell formation is restricted.

Still further, a blowing agent should be non-toxic and odorless as should its decomposition product. Moreover, both the blowing agent itself and its decomposition product should preferably be colorless, thereby permitting its use in the manufacture of all types of cellular products, including those which must be light in color and free of stain.

It has now been discovered that the above described characteristics required of a blowing agent are fulfilled surprisingly well by a class of organic sulfamoyl azides represented by the formula:

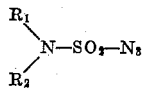

in which $R_1$ and $R_2$ represents various organic radicals, for instance, alkyl such as methyl, ethyl, butyl or the like; cycloalkyl such as cyclohexyl and the like; and in which $R_1$ and $R_2$ taken together with the nitrogen form a heterocyclic radical such as pyrrolidyl, piperidyl, morpholyl and the like.

In general, the alkyl and cycloalkyl derivatives of this invention are prepared by reacting the corresponding sulfamoyl halide with an alkali azide in an aqueous-alcoholic solution at from room temperature up to 50° C. In the preparation of the heterocyclic derivatives, the hydrochloride of the free base is reacted with sulfuryl chloride to give the N-sulfonyl chloride which is then reacted with an alkali azide.

The blowing agents of this invention are particularly effective in forming cellular rubber products. They may be used with either natural rubber or with synthetic rubbers such as polymers and copolymers of butadiene-1,3. When so used, the blowing agent may be conveniently added during compounding in which the various materials are added to the rubber in preparation for vulcanization. The amount of blowing agent employed with rubber will vary according to the particular kind of rubber being treated, the particular blowing agent, the degree of blow desired and the like. As little as 0.5% by weight on the rubber may be satisfactorily employed in many instances. In general, however, the amount of blowing agent will vary from about 0.5% to 4% on the rubber, preferably from about 1% to about 3%.

The blowing agents of this invention are also useful in the preparation of foamed plastic materials. Where other classes of blowing agents, e.g., organic sulfonyl azides, are useful only in the preparation of cellular rubber and other thermosetting resinous products, the present class of blowing agents is also useful in preparing thermoplastic resinous products. Thus, in addition to forming blown natural and synthetic rubber, the present class of blowing agents may be employed in forming foam urea-aldehyde resins, phenol-aldehyde resins, melamine aldehyde resins, and the like, as well as foam thermoplastic resinous products, by which is meant a polymeric product of at least one vinyl type monomer such as acrylonitrile, styrene, methylacrylate, acrylic acid, maleic anhydride and the like. In usage for the preparation of foam plastics, the amount of blowing agent will generally run from about 10 to about 30% depending upon the particular blowing agent, the material being treated, the degree of blow desired and the like.

By organo plastic materials in accordance with this invention, therefore, is meant natural and synthetic rubbers as well as polymeric products generally classified as thermosetting and thermoplastic resins, all as defined above.

The following examples illustrate the preparation of the blowing agents of this invention. Unless otherwise noted, all parts are by weight.

EXAMPLE 1

*Diethylsulfamoyl azide*

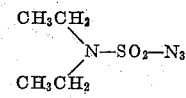

To a solution obtained by warming 18 parts of sodium azide in 50 parts of water is added 82 parts of alcohol and, with stirring at 32° C., a mixture of 35.2 parts of diethylsulfamoyl chloride in 18 parts of alcohol. When the reaction is complete, 200 parts of water are added and the mixture stirred. The colorless heavy oil product is then drawn off and dried over three parts of a drying agent to give a yield of 31.2 parts of product.

EXAMPLE 2

*Dimethylsulfamoyl azide*

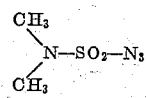

The procedure of Example 1 is repeated except that a chemically equivalent amount of dimethylsulfamoyl chloride is employed. Upon completion of the reaction, the product is recovered and dried in a similar manner.

EXAMPLE 3

*Dipropylsulfamoyl azide*

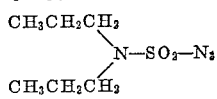

The procedure of Example 1 is again repeated employing a chemically equivalent amount of dipropylsulfamoyl chloride.

EXAMPLE 4

*Dibutylsulfamoyl azide*

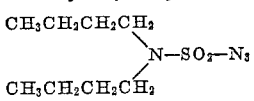

The procedure of Example 1 is again repeated using a chemically equivalent amount of dibutylsulfamoyl chloride.

EXAMPLE 5

*Diamylsulfamoyl azide*

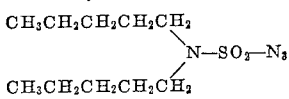

The procedure of Example 1 is again repeated except a chemically equivalent amount of diamylsulfamoyl chloride is employed.

EXAMPLE 6

*Oxy-diethylene-sulfamoyl azide*

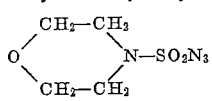

To 219 parts of sulfuryl chloride there is gradually added, with stirring, 70 parts of morpholine hydrochloride, the mixture heated to remove hydrogen chloride, and then drowned in ice water to separate morpholine-N-sulfonyl chloride as a heavy oil. 18.6 parts of this oil is dissolved in an equal weight of ethanol and the resulting solution added gradually with stirring at 30° C. to a solution of 6.5 parts of sodium azide in 17 parts of water and 28 parts of alcohol. The product, oxy-diethylenesulfamoyl azide, is separated and dried.

EXAMPLE 7

*N-methyl-N-cyclohexylsulfamoyl azide*

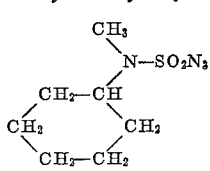

The procedure of Example 6 is repeated except that an equivalent amount of N-methyl-N-cyclohexylsulfamoyl chloride is prepared instead of morpholine-N-sulfonyl chloride, and a chemically equivalent amount reacted with sodium azide. The resultant N-methyl-N-cyclohexylsulfamoyl azide is then recovered and dried as before.

EXAMPLE 8

*Dicyclohexylsulfamoyl azide*

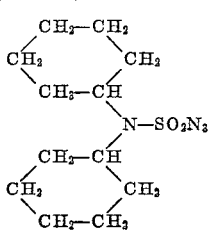

The procedure of Example 6 is repeated except that dicyclohexylsulfamoyl azide is prepared. 28 parts of dicyclohexyl-sulfamoyl chloride is then dissolved in an equal weight of ethanol, and the resulting solution is added gradually with stirring, at 25–35° C., to a solution of 6.5 parts of sodium azide in 17 parts of water and 28 parts of ethanol. After the reaction is complete, the product is separated and dried.

The following example illustrates the preparation of cellular rubber using the blowing agents of this invention.

EXAMPLE 9

Rubber stocks are compounded according to the following composition using as blowing agents diethylsulfamoyl azide, N-methyl-N-cyclohexylsulfamoyl azide and oxy-diethylene-sulfamoyl azide.

| Compound: | Parts |
|---|---|
| Pale crepe | 100 |
| Stearic acid | 2 |
| Zinc oxide | 5 |
| Keystone whiting | 50 |
| Light process oil (softener) | 10 |
| Petrolatum | 3 |
| 2,2'-methylene-bis-(4 - methyl-6-t-butylphenol) | 0.5 |
| Sulfur | 3 |
| Bis-benzothiazolyl disulfide | 0.6 |
| Di-o-tolyl guanidine | 0.15 |
| Blowing agent | 1.5 |

Samples of each stock are blown at 130° C. for 60 minutes and at 153° C. for 35 minutes. The mold size is 6 cubic inches and both high (200% expansion) and low (150% expansion) loads are blown at each temperature. In each instance, a blown product is obtained having medium-fine cells and having only slightly rounded corners indicating that the blown product substantially completely fills the mold.

This application is a continuation-in-part of copending application Serial No. 622,262, filed November 15, 1956, of the applicants herein.

We claim:

1. A process of producing a cellular organo-plastic material which comprises incorporating in an uncured organo-plastic material an organic sulfamoyl azide having the formula

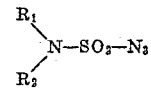

in which $R_1$ and $R_2$ are selected from the group consisting of alkyls of 1–6 carbons; cycloalkyl; and in which $R_1$ and $R_2$ taken together with the nitrogen form a heterocyclic radical selected from the group consisting of pyrrolidyl, piperidyl and morpholyl; and heating the resultant mixture at a temperature and for a time sufficient to decompose the azide and cure the organo-plastic material, the organic sulfamoyl azide being in amount sufficient to produce a cellular material.

2. A process according to claim 1 in which the organic sulfamoyl azide is dimethylsulfamoyl azide.

3. A process according to claim 1 in which the organic sulfamoyl is diethylsulfamoyl azide.

4. A process according to claim 1 in which the organic sulfamoyl azide is dicyclohexylsulfamoyl azide.

5. A process according to claim 1 in which the organic sulfamoyl azide is N-methyl-N-cyclohexylsulfamoyl azide.

6. A process according to claim 1 in which the organic sulfamoyl azide is oxy-diethylene-sulfamoyl azide.

No references cited.